US012600195B2

(12) United States Patent 
Setterberg et al.

(10) Patent No.: US 12,600,195 B2 
(45) Date of Patent: Apr. 14, 2026

(54) VEHICLE COMPARTMENT AIR REPLACEMENT

(71) Applicants:Ningbo Geely Automobile Research & Development Co., Ltd., Ningbo (CN); Zhejiang Geely Holding Group Co., Ltd., Zhejiang (CN)

(72) Inventors: Johan Setterberg, Gothenburg (SE); Måns Pihlsgård, Gothenburg (SE); Erik Lindberg Nilsson, Gothenburg (SE)

(73) Assignees: ZHEJIANG GEELY HOLDING GROUP CO., LTD., Zhejiang (CN); Ningbo Geely Automobile Research & Dev. Co., Ltd., Ningbo (CN)

( * ) Notice: Subject to any disclaimer, the term of this patent is extended or adjusted under 35 U.S.C. 154(b) by 534 days.

(21) Appl. No.: 17/888,888

(22) Filed: Aug. 16, 2022

(65) Prior Publication Data

US 2022/0396115 A1     Dec. 15, 2022

Related U.S. Application Data

(63) Continuation of application No. PCT/CN2021/072457, filed on Jan. 18, 2021.

(30) Foreign Application Priority Data

Feb. 24, 2020   (EP) ..................................... 20159018

(51) Int. Cl.
B60H 1/00         (2006.01)
B60N 2/00         (2006.01)
(52) U.S. Cl.
CPC ....... B60H 1/0073 (2019.05); B60H 1/00742 (2013.01); B60N 2/0025 (2023.08);
(Continued)

(58) Field of Classification Search
CPC .............. B60H 1/0073; B60H 1/00742; B60H 1/00357; B60H 1/00657; B60H 1/00778; B60N 2/002
See application file for complete search history.

(56) References Cited

U.S. PATENT DOCUMENTS

| | | |
|---|---|---|
| 4,658,707 A | 4/1987 | Hawkins |
| RE37,150 E * | 5/2001 | Anonychuk ....... B01D 46/0005 |
| | | 55/482 |

(Continued)

FOREIGN PATENT DOCUMENTS

| | | |
|---|---|---|
| CN | 104842743 A | 8/2015 |
| CN | 107471954 A | 12/2017 |

(Continued)

OTHER PUBLICATIONS

International Search Report from International Application No. PCT/CN2021/072457, dated Apr. 19, 2021, 3 pages.

*Primary Examiner* — Ian Jen
(74) *Attorney, Agent, or Firm* — Tucker Ellis LLP

(57)         ABSTRACT
A method for preparing a vehicle prior to an occupant entering the vehicle includes acquiring information indicative of an upcoming time of entry of the occupant into a compartment of the vehicle, and commencing air replacement of at least part of the air in the compartment of the vehicle prior to the upcoming time of entry of the occupant. In some embodiments, the method also includes detecting whether the compartment of the vehicle has occupants, and commencing the air replacement responsive to detecting that the compartment of the vehicle has no occupants. In some embodiments, the method further includes determining a latest possible time for commencing the air replacement provided that the air replacement is to be completed at the upcoming time of entry of the occupant, and commencing
(Continued)

the air replacement based on the determined latest possible time.

17 Claims, 2 Drawing Sheets

(52) U.S. Cl.
CPC ........ *B60N 2/0026* (2023.08); *B60N 2210/26* (2023.08); *B60N 2210/30* (2023.08)

(56) References Cited

U.S. PATENT DOCUMENTS

| | | | | |
|---|---|---|---|---|
| 6,758,739 | B1 | 7/2004 | Sangwan | |
| 8,649,941 | B1 * | 2/2014 | Tsuda | B60H 1/00771 |
| | | | | 701/96 |
| 10,245,923 | B1 * | 4/2019 | Lau | B60H 3/0014 |
| 11,560,038 | B2 * | 1/2023 | Hoshino | B60H 1/00807 |
| 11,731,487 | B2 * | 8/2023 | Takata | B60H 1/00778 |
| | | | | 454/75 |
| 11,801,730 | B1 * | 10/2023 | Vader | B60H 1/00357 |
| 11,815,614 | B2 * | 11/2023 | Cuddihy | G01S 5/02525 |
| 11,964,543 | B2 * | 4/2024 | Tanner | B60H 3/0021 |
| 2007/0119959 | A1 * | 5/2007 | Wieszt | B60H 1/00642 |
| | | | | 236/1 C |
| 2009/0286459 | A1 | 11/2009 | Major | |
| 2016/0207374 | A1 * | 7/2016 | Gauthier | B60H 1/00742 |
| 2017/0210391 | A1 | 7/2017 | Dudar | |
| 2017/0285642 | A1 * | 10/2017 | Rander | B60H 1/00357 |
| 2018/0022182 | A1 | 1/2018 | Miller | |
| 2018/0134114 | A1 * | 5/2018 | Eckelberg | B60H 1/00521 |
| 2018/0218470 | A1 * | 8/2018 | Belwafa | G06Q 50/40 |
| 2018/0225551 | A1 | 8/2018 | Lin | |
| 2018/0229587 | A1 | 8/2018 | Gao | |
| 2018/0281554 | A1 * | 10/2018 | Duan | B60W 40/02 |
| 2018/0370474 | A1 * | 12/2018 | Krishnan | B60G 13/14 |
| 2019/0118616 | A1 | 4/2019 | Morita | |
| 2019/0143794 | A1 | 5/2019 | Ligi, Jr. | |

FOREIGN PATENT DOCUMENTS

| | | |
|---|---|---|
| CN | 107962927 A | 4/2018 |
| CN | 108382153 A | 8/2018 |
| CN | 109774413 A | 5/2019 |
| EP | 3312764 A2 | 4/2018 |
| JP | 2009280063 A | 12/2009 |
| WO | 2019117878 A1 | 6/2019 |

* cited by examiner

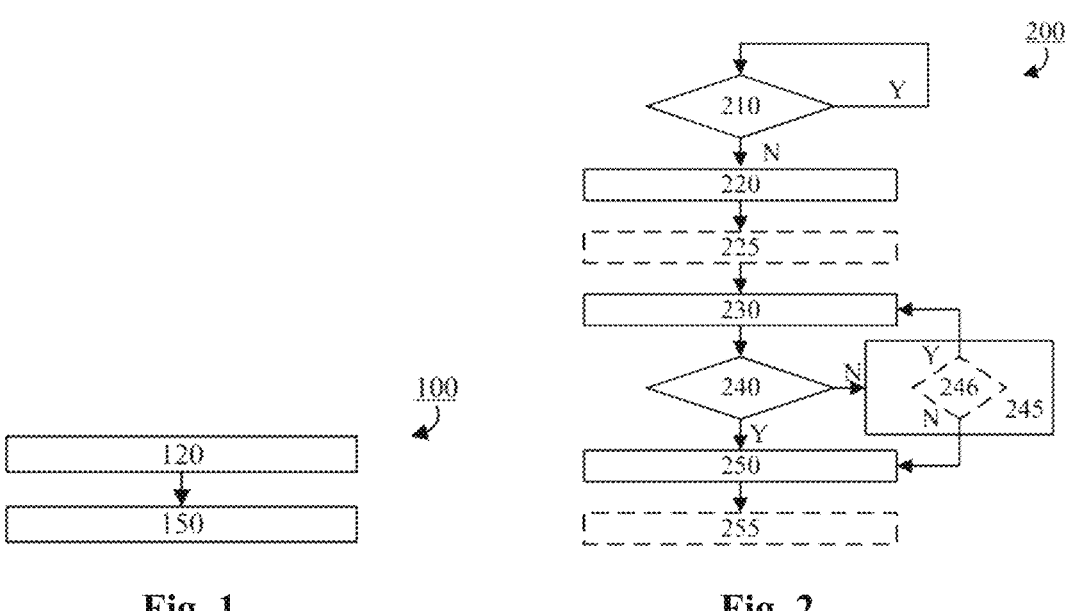
Fig. 1
Fig. 2
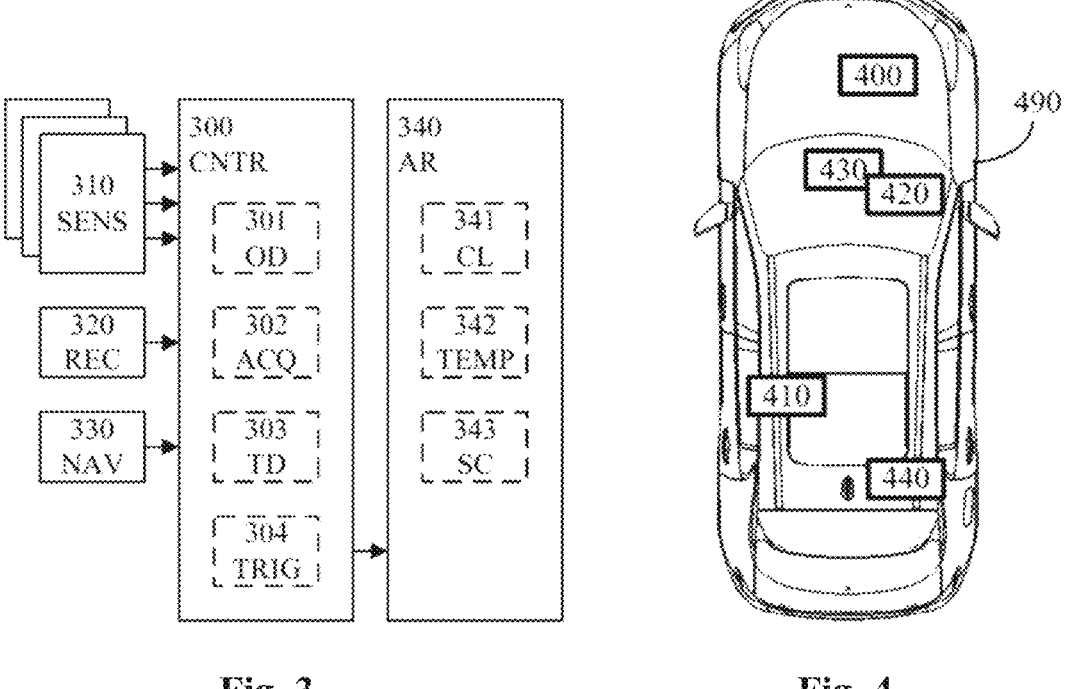
Fig. 3
Fig. 4

VEHICLE COMPARTMENT AIR REPLACEMENT

RELATED APPLICATION DATA

This application is a continuation of International Patent Application No. PCT/CN2021/072457, filed Jan. 18, 2021, which claims the benefit of European Patent Application No. 20159018.9, filed Feb. 24, 2020, the disclosures of which are incorporated herein by reference in their entireties.

TECHNICAL FIELD

The present disclosure relates generally to the field of vehicle control. More particularly, it relates to control of air quality in a compartment of a vehicle.

BACKGROUND

Various approaches for controlling air quality in a compartment of a vehicle are known. For example, U.S. Pat. No. 6,758,739 B1 describes an air quality system for controlling air quality in a cabin of a vehicle.

According to U.S. Pat. No. 6,758,739 B1, a controller is programmed to determine a current value of air quality parameters detected by air quality sensors and to determine whether the current value of any of the air quality parameters exceeds a predetermined limit. The controller is operable between purging and non-purging modes to purge the air from the cabin in the purging mode when the current value of any of the measured air quality parameters exceeds the respective predetermined limit. The air quality system is described as capable of quickly and efficiently replace the air in the cabin of the vehicle with fresh air from outside of the cabin of the vehicle.

Entering the purging mode when the current value of any of the measured air quality parameters exceeds the respective predetermined limit may have one or more disadvantages. For example, the energy efficiency of such an approach may be sub-optimal. Alternatively or additionally, vehicle occupants may experience discomfort during the purging mode.

Therefore, there is a need for alternative approaches to air quality control for vehicles. Preferably, such alternative approaches to air quality control for vehicles improve (e.g., increase) energy efficiency and/or improve the experience of vehicle occupants.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

More specifically, it is an object of some embodiments to provide alternative approaches to air quality control for vehicles.

One object of some embodiments is to improve (e.g., increase) energy efficiency.

One object of some embodiments is to improve the experience of vehicle occupants.

A first aspect is a method for preparing a vehicle prior to an occupant entering the vehicle. The method comprises acquiring information indicative of an upcoming time of entry of the occupant into a compartment of the vehicle, and commencing air replacement of at least part of the air in the compartment of the vehicle prior to the upcoming time of entry of the occupant.

An advantage of this aspect is that a method is provided by which the occupant experience is improved since air replacement is commenced before the occupant enters the compartment. Thereby, the air is (at least partly) replaced at occupant entry, which may entail that the occupant encounters substantially fresh air and/or that the occupant is not unnecessarily exposed to the air replacement process.

A particular advantage of some embodiments of this aspect is that the concentration of carbon-dioxide in the compartment may be suitably controlled (e.g., reduced).

A particular advantage of some embodiments of this aspect is that the concentration of (potentially) contagious particles—e.g., aerosols, viruses, bacteria, etc.—in the compartment may be suitably controlled (e.g., reduced).

An advantage of this aspect is that a method is provided by which energy efficiency is improved since air replacement is commenced before the occupant enters the compartment. Thereby, since the occupant has not yet entered the compartment, the air replacement may be commenced at high vigor without disturbing the occupant about to enter.

In some embodiments, the method further comprises detecting whether the compartment of the vehicle has occupants, and commencing the air replacement responsive to detecting that the compartment of the vehicle has no occupants.

An advantage of these embodiments is that a method is provided by which occupant experience is further improved since air replacement is commenced when there are no occupants in the compartment. Thereby, no occupant is unnecessarily exposed to the air replacement process.

An advantage of these embodiments is that a method is provided by which energy efficiency is further improved since air replacement is commenced when there are no occupants in the compartment. Thereby, the air replacement may be commenced at maximum vigor without disturbing any occupant(s).

In some embodiments, detecting that the compartment of the vehicle has no occupants comprises one or more of: using an image sensor and image recognition algorithms to determine absence of occupants, using a motion detector to determine absence of motions, using an ultrasonic sensor to determine absence of motions, using a temperature sensor to determine absence of warm-blooded bodies, using a life sign sensor to determine absence of life signs, using a seat sensor to determine that a weight applied to a seat does not exceed a weight threshold value, receiving a pick-up request, and detecting (responsive to destination arrival) customer payment and/or compartment door closing and/or loss of signal for a wireless communication device.

An advantage of these embodiments is that a method is provided by which it is reliably determined whether or not the compartment of the vehicle has any occupant(s).

In some embodiments, acquiring information indicative of an upcoming time of entry of an occupant into the vehicle comprises one or more of: estimating the time of entry based on a statistical use pattern for the vehicle, estimating the time of entry based on a distance between the vehicle and a wireless communication device associated with the occupant, receiving a scheduled pick-up time, and estimating a time of arrival at a pick-up location.

An advantage of these embodiments is that a method is provided by which the upcoming time of entry is reliably determined. This in turn has the advantage that commencing air replacement may be more accurately timed.

In some embodiments, the method further comprises determining a latest possible time for commencing the air replacement provided that the air replacement is to be completed at the upcoming time of entry of the occupant, and commencing the air replacement based on the determined latest possible time.

An advantage of these embodiments is that a method is provided by which commencing air replacement may be timed with the aim of being completed at the upcoming time of entry.

In some embodiments, determining the latest possible time for commencing the air replacement provided that the air replacement is to be completed at the upcoming time of entry of the occupant is based on a shortest possible time for air replacement.

An advantage of these embodiments is that a method is provided by which commencing air replacement may be timed with the aim of being completed at the upcoming time of entry.

In some embodiments, commencing the air replacement based on the determined latest possible time comprises one or more of: commencing air replacement in association with occurrence of the latest possible time, and commencing air replacement immediately if the latest possible time has already occurred.

An advantage of these embodiments is that a method is provided by which commencing air replacement may be timed with the aim of being completed just in time for the upcoming time of entry.

An advantage of these embodiments is that a method is provided by which energy efficiency is further improved since air replacement is commenced such that it is completed just in time for occupant entry. Thereby, no unnecessary air freshening (e.g., continued air replacement) need to be conducted to keep the compartment air fresh after completion of air replacement and up to occupant entry.

In some embodiments, the method further comprises cleaning air before injection into the interior of the vehicle.

An advantage of these embodiments is that a method is provided by which occupant experience is further improved since the air is clean.

An advantage of these embodiments is that a method is provided by which the risk of contagions between successive occupants is reduces since the air is cleaned from contagious particles.

In some embodiments, the method further comprises heating and/or chilling air in association with injection into the interior of the vehicle.

An advantage of these embodiments is that a method is provided by which occupant experience is further improved since the air is suitably tempered.

In some embodiments, the method further comprises scenting air in association with injection into the interior of the vehicle.

An advantage of these embodiments is that a method is provided by which occupant experience is further improved since the air has pleasant fragrance.

In some embodiments, the method further comprises acquiring information indicative of preferences of the occupant entering the vehicle, and controlling heating/chilling and/or cleaning and/or scenting of air based on the preferences.

An advantage of these embodiments is that a method is provided by which occupant experience is further improved since temperature and/or acceptable pollution and/or fragrance is in accordance with personal preferences.

In some embodiments, the vehicle is operating to provide transport service to occupants.

In some embodiments, the method further comprises determining that a transport service of a previous occupant of the vehicle compartment to a destination is completed, and commencing the air replacement after the vehicle has arrived at the destination.

An advantage of these embodiments is that a method is provided by which occupant experience is further improved since air replacement is commenced when it is likely that there are no occupants in the compartment. Thereby, no occupant is unnecessarily exposed to the air replacement process.

A second aspect is a computer program comprising program instructions. The computer program is loadable into a data processing unit and configured to cause execution of the method according to the first aspect when the computer program is run by the data processing unit.

An advantage of this aspect is that a software implementation is provided of the method that enables improved occupant experience and/or energy efficiency.

A third aspect is a computer program product comprising a computer readable medium carrying a computer program comprising program instructions. The computer program is loadable into a data processing unit and configured to cause execution of the method according to the first aspect when the computer program is run by the data processing unit.

An advantage of this aspect is that a carrier is provided for the software implementing the method that enables improved occupant experience and/or energy efficiency.

A fourth aspect is a control unit for controlling preparation of a vehicle prior to an occupant entering the vehicle. The control unit is configured to cause execution of the method according to the first aspect.

An advantage of this aspect is that a hardware implementation is provided of the method that enables improved occupant experience and/or energy efficiency.

A fifth aspect is an apparatus for controlling preparation of a vehicle prior to an occupant entering the vehicle. The apparatus comprises controlling circuitry configured to cause acquisition of information indicative of an upcoming time of entry of the occupant into a compartment of the vehicle, and commence of air replacement of at least part of the air in the compartment of the vehicle prior to the upcoming time of entry of the occupant.

An advantage of this aspect is that a physical apparatus is provided that enables improved occupant experience and/or energy efficiency.

A sixth aspect is a system for preparing a vehicle prior to an occupant entering the vehicle. The system comprises a receiver configured to acquire information indicative of an upcoming time of entry of the occupant into a compartment of the vehicle, and controlling circuitry configured to control an air replacement device of the vehicle to commence the replacement of at least part of the air in the compartment of the vehicle prior to the upcoming time of entry of the occupant.

An advantage of this aspect is that a system is provided that enables improved occupant experience and/or energy efficiency.

A seventh aspect is a vehicle comprising one or more of: the control unit of the fourth aspect, the apparatus of the fifth aspect, and the system of the sixth aspect.

An advantage of this aspect is that a vehicle is provided that enables improved occupant experience and/or energy efficiency.

In some embodiments, any of the above aspects may additionally have features identical with or corresponding to any of the various features as explained above for any of the other aspects.

An advantage of some embodiments is that alternative approaches to air quality control for vehicles.

A general advantage of some embodiments is that good air quality is achieved.

An advantage of some embodiments is that energy efficiency is improved (e.g., increased).

An advantage of some embodiments is that the experience of vehicle occupants is improved.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a flowchart illustrating example method steps according to some embodiments;

FIG. 2 is a flowchart illustrating example method steps according to some embodiments;

FIG. 3 is a schematic block diagram illustrating an example system according to some embodiments;

FIG. 4 is a schematic drawing illustrating an example vehicle according to some embodiments;

DETAILED DESCRIPTION

Figure 5:
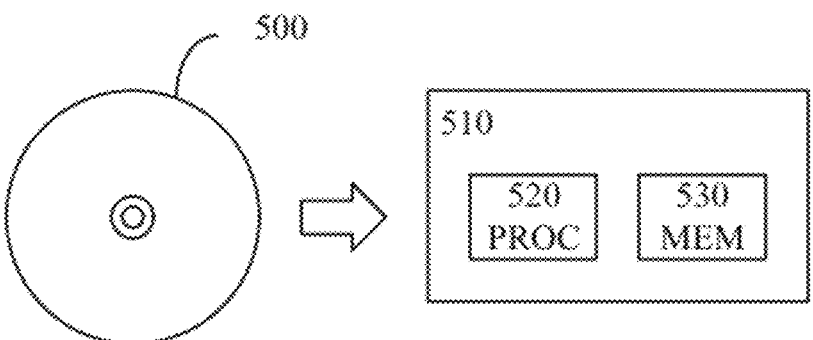
FIG. 5 is a schematic drawing illustrating an example computer readable medium according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

When a vehicle is used, the air of the interior of the vehicle may become polluted. This may be particularly cumbersome for a taxi car, which typically serves many customers during the day. Thus, there is often a need to replace the air between vehicle occupants (e.g., after one customer leaves and before another customer arrives), for example, due to an urge to remove odors, increase oxygen concentration, reduce carbon dioxide concentration, etc. It may be desirable that the air quality is at an acceptable level when the new occupant enters the vehicle. It may also be desirable to perform the air replacement as energy efficiently as possible.

In the following, embodiments will be described where alternative approaches to air quality control for vehicles are provided. In some embodiments, the approaches improve energy efficiency and/or the experience of vehicle occupants.

FIG. 1 illustrates an example method 100 according to some embodiments. The method 100 is for preparing a vehicle prior to an occupant entering the vehicle. For example, the method 100 may be seen as a method for controlling air replacement of an interior of a compartment of the vehicle.

In step 120, information is acquired which is indicative of an upcoming time of entry of the occupant into a compartment of the vehicle.

In step 150, air replacement of at least part of the air in the compartment of the vehicle is commenced prior to the upcoming time of entry of the occupant.

According to some embodiments, the vehicle is operating to provide transport service to occupants. In such embodiments, the method may further comprise (e.g., before step 120) determining that a transport service of a previous occupant of the vehicle compartment to a destination is completed so that the air replacement of step 150 is commenced after the vehicle has arrived at the destination.

FIG. 2 illustrates an example method 200 according to some embodiments. The method 200 is for preparing a vehicle prior to an occupant entering the vehicle. For example, the method 200 may be seen as a method for controlling air replacement of an interior of a compartment of the vehicle.

Generally, air replacement may refer to injection of air from an exterior of the compartment/vehicle, and/or to processing of recirculated air.

In some embodiments, air replacement is possible at different vigor (pace, speed), and the highest vigor (or any vigor above a vigor threshold value) may be unpleasant, or even unhealthy, for a compartment occupant, while a more moderate vigor is normally used when the compartment is occupied.

The vehicle may, for example, be one of: a car or another road-travelling vehicle, a train or another rail-travelling vehicle, a boat or another water-travelling vehicle, and an airplane or another flying vehicle.

The vehicle may be controlled by a human or robotic operator (driver/pilot/captain/etc.), or may be an autonomously operating (self-driving) vehicle.

Example functional instantiations of the vehicle include a privately owned and/or used vehicle, a fleet vehicle, a taxi vehicle, a route-bound public transport vehicle, an ambulance vehicle, a prisoner transport vehicle, etc.

The compartment of the vehicle may comprise an entire occupant space of the vehicle (e.g., a car interior), or an enclosed sub-space of the occupant space of the vehicle (e.g., a passenger compartment of a taxi—separated from a driver compartment, a medical treatment compartment of an ambulance, a train compartment, etc.).

In step 210, it is detected whether the compartment of the vehicle has occupants. Generally, occupants include humans. In some embodiments, occupants may also include other animals (e.g., mammals, pet animals, or similar).

Any suitable approach (or combination of approaches) may be used to determine whether the compartment of the vehicle has occupants.

Generally, devices used to determine whether the compartment of the vehicle has occupants may comprise devices associated with the vehicle (e.g., mounted, or mountable, in the vehicle) and/or devices associated with an occupant of the vehicle (e.g., carried by, or implanted in, the occupant).

According to one example, one or more image sensor is used together with image recognition algorithms to determine presence or absence of occupants. When it is recognized that an image depicts a human or other animal, presence of occupant(s) may be concluded. When it is not recognized that an image depicts a human or other animal, absence of occupant(s) may be concluded or determined to be likely. Example image sensors include cameras, radar sensors, LIDAR sensors, etc.

According to one example, one or more motion detector is used to determine presence or absence of motion. When motion is detected, presence of occupant(s) may be concluded. When no motion is detected (e.g., for some specified period of time), absence of occupant(s) may be concluded or determined to be likely. Example motion detectors include cameras, radar sensors, LIDAR sensors, etc.

According to one example, one or more ultrasonic sensor is used to determine presence or absence of motion. When motion is detected, presence of occupant(s) may be concluded. When no motion is detected (e.g., for some specified period of time), absence of occupant(s) may be concluded or determined to be likely.

According to one example, one or more temperature sensor is used to determine presence or absence of warm-blooded bodies (supposedly occupants). When one or more warm-blooded bodies are detected, presence of occupant(s) may be concluded. When no warm-blooded bodies are detected, absence of occupant(s) may be concluded or determined to be likely. Example temperature sensors include infra-red cameras, etc. For example, the temperature sensor may detect absolute temperature and determine that a warm-blooded body is detected if a local temperature in an interval, e.g., 35-40° C. is detected. Alternatively or additionally, the temperature sensor may determine a homogeneity of temperature in the compartment and determine that a warm-blooded body is detected if the temperature is non-homogenous.

According to one example, one or more life sign sensor is used to determine presence or absence of life signs. When a life sign is detected, presence of occupant(s) may be concluded. When no life sign is detected (e.g., for some specified period of time), absence of occupant(s) may be concluded or determined to be likely. Example life sign sensors include heartbeat sensors, infrared sensors, atmosphere composition sensors for detecting breathing emissions, microphones combined with speech detection and/or breathing detection, etc.

According to one example, one or more seat sensor is used to determine whether a weight applied to a seat exceeds a weight threshold value. When the weight exceeds the threshold, presence of occupant(s) may be concluded. When the weight does not exceed the threshold, absence of occupant(s) may be concluded or determined to be likely.

According to one example, it is determined that there are no occupants in response to receiving a pick-up request. This example may be applicable, for example, if a self-driving vehicle received the pick-up request when it is in a parked position (e.g., a garage or a parking lot), when it is the start of an operation cycle (e.g., after fueling/recharging), or when it is otherwise known that a previous occupant has left the compartment. A particular example relates to a taxi getting a pick-up request at a taxi garage, at a recharging station, or after having delivered a previous customer to the desired destination. Another particular example relates to an ambulance getting an emergency pick-up request while in waiting mode.

According to one example, when it is detected (after destination arrival) that a customer has paid for vehicle utilization, absence of occupant(s) may be concluded or determined to be likely.

According to one example, when it is detected (after destination arrival) that a compartment door is being closed, absence of occupant(s) may be concluded or determined to be likely.

According to one example, when it is detected (after destination arrival) that a wireless communication device which has been present during vehicle utilization is removed, absence of occupant(s) may be concluded or determined to be likely. For example, the wireless communication device may be a device owned/kept by the occupant, such as a smartphone used by a customer to order the ride, a watch, or an identity chip. Presence of the wireless communication device may be detected using any suitable wireless signaling or sensing. Removal of the wireless communication device may be detected by loss of signal, for example.

Any suitable combination of these and other examples may also be considered for determining whether the compartment of the vehicle has occupants.

When it is detected that the compartment has occupants (Y-path out of step 210), the method is idle until it is detected that the compartment has no occupants; illustrated by the loop-back to 210 in FIG. 2. When it is detected that the compartment has no occupants (N-path out of step 210), the method proceeds to step 220.

In step 220, information is acquired which is indicative of an upcoming time of entry of the occupant into a compartment of the vehicle. The upcoming time of entry may, for example, be defined in terms of a point in time or in terms of a time interval.

Acquiring the information may comprise receiving the information and/or determining the information.

Any suitable approach (or combination of approaches) may be used to acquire the information indicative of an upcoming time of entry of the occupant into a compartment of the vehicle.

According to one example, the upcoming time of entry is acquired by estimation based on a statistical use pattern for the vehicle. The statistical use pattern may be vehicle-specific. For example, a privately owned/used vehicle may keep (locally or remotely) a dynamic use schedule based on historical use and/or information provided by the user. Alternatively or additionally, the statistical use pattern may relate to a plurality of vehicles that include the vehicle under consideration. For example, a fleet vehicle or a taxi may have an associated dynamic and/or geography-related use schedule based on historical fleet/taxi utilization.

According to one example, the upcoming time of entry is acquired by estimation based on the distance between the vehicle and a wireless communication device associated with the occupant. For example, the location of the vehicle may be compared with the location of a wireless communication device of the owner/customer to estimate a time duration until the owner/customer can reach the vehicle (e.g., by foot or using other transportation) and/or to estimate a time duration until the vehicle can reach the owner/customer. This example may be implemented by reception of such information from a navigation system of the vehicle, for example.

According to one example, the upcoming time of entry is acquired by reception of a scheduled pick-up time (e.g., for a taxi or a privately owned autonomous car).

According to one example, the upcoming time of entry is acquired by estimation of a time of arrival at a pick-up location (e.g., for a taxi or a privately owned autonomous car). This example may be implemented by reception of such information from a navigation system of the vehicle, for example.

Any suitable combination of these and other examples may also be considered for determining the upcoming time of entry of the occupant into a compartment of the vehicle.

In step 230, a latest possible time is determined for commencing the air replacement provided that the air replacement is to be completed at the upcoming time of entry of the occupant.

For example, completion of air replacement may be defined as replacement of a portion (e.g., 50%, 90%, 95%, 99%, or 100%) of all air in the compartment and/or as a certain amount of air (e.g., a portion of an air volume of the compartment) passing an air inlet, an air outlet, or an air recycler.

According to some embodiments, the latest possible time for commencing the air replacement provided that the air replacement is to be completed at the upcoming time of entry of the occupant is determined based on a shortest possible time for air replacement.

The shortest possible time for air replacement may, for example, be defined in terms of a time duration.

For example, if air replacement is possible at different vigor, the shortest possible time for air replacement may be determined as the duration needed to complete air replacement using the highest vigor.

In some embodiments, the latest possible time for commencing the air replacement provided that the air replacement is to be completed at the upcoming time of entry of the occupant may be determined as the upcoming time of entry of the occupant minus the shortest possible time for air replacement.

The air replacement is then commenced based on the determined latest possible time. This is exemplified by 240 and 245 in FIG. 2.

In step 240, it is determined whether the latest possible time has already occurred. If so (Y-path out of step 240), the method continues immediately to step 250. If the latest possible time has not occurred already (N-path out of step 240), a waiting period is applied as illustrated by 245 before continuing to step 250.

In optional sub-step 246, it is determined whether one or more conditions change during the waiting time (e.g., if the shortest possible time for air replacement changes, for example, due to more—or less—pollution than expected, and/or if the upcoming time of entry from step 220 changes, for example, due to an unexpected change in vehicle speed). If so (Y-path out of 246), the method may return to step 230 to determine an updated latest possible time for commencing the air replacement. If not (N-path out of 246), the method continues to step 250 when the waiting period is completed.

The waiting time of 245 may be set such that continuation to step 250 occurs in association with occurrence of the latest possible time (e.g., at occurrence of the latest possible time, slightly before the latest possible time) or at any time before the latest possible time which is determined suitable.

An advantage of some embodiments is that good air quality is achieved in time for the new occupant entering the compartment.

In some scenarios, the air quality will probably be suboptimal when the new occupant enters if air replacement is commenced much earlier than the latest possible time. Example reasons include that polluted air may have entered the compartment after the air was refreshed (e.g., cleaned, tempered, scented, etc.) in association with the air replacement process.

In some scenarios, however a point in time (much) earlier than the latest possible time may be suitable. A time before the latest possible time may be determined suitable based on, for example, an air quality index (e.g., measured by vehicles in a vehicle fleet and/or acquired from another source). For example, if a geographical area for occupant pick-up is indicated as very polluted, it may be suitable to commence the air replacement earlier than in association with the latest possible time (such that air replacement is expected to be completed when entering the heavily polluted geographical area) and keep the replaced fresh air in recirculation (possibly through a cleaning filter) after entering the heavily polluted geographical area and before the occupant enters the compartment.

In step 250 air replacement is commenced. The air replacement is for replacing at least part of the air in the compartment of the vehicle prior to the upcoming time of entry of the occupant (compare with exemplification above relating to completion of air replacement).

Typically, the air replacement is commenced at a relatively high vigor (e.g., highest possible vigor). At the upcoming time of entry of the occupant and/or at detection of entry of the occupant, air replacement may be adjusted to a more moderate vigor or turned off.

In some embodiments, the replacement air is cleaned before injection into the interior of the vehicle. Cleaning may, for example, relate to removing or decreasing pollutions or other un-desired content (e.g., pollen, allergens, toxics, smog, particles, tobacco smoke, other smoke, odors, virus, bacteria, aerosols, etc.). As an example, un-desired content may be reported by a particle sensor (e.g., a PM2.5 sensor).

In some embodiments, the replacement air is tempered (e.g., heated and/or chilled) in association with injection into the interior of the vehicle.

In some embodiments, the replacement air is scented in association with injection into the interior of the vehicle.

Cleaning, tempering, and scenting of replacement air is collectively illustrated by optional step 255 in FIG. 2, and may be collectively denoted as refreshing.

In some embodiments, information indicative of preferences of the occupant entering the vehicle is acquired (illustrated by optional step 225 in FIG. 2), and tempering and/or cleaning and/or scenting in step 255 is based on the preferences. Acquisition of the preferences may be achieved as part of ordering a pick-up, for example. The preferences may be ride-specific (e.g., entered for a specific pick-up) or they may be pre-entered as associated to a particular user (e.g., an owner of private vehicle, a user of a private or fleet vehicle, a customer of a taxi fleet or public transport fleet, etc.), for example in the form of a user profile.

The preferences regarding cleaning may, for example, specify for different types of pollution whether or not the pollution type is acceptable to the user, and possibly an acceptable concentration for the pollution type. As a more specific example, a first user may accept any pollen but not sulfur-smelling particles, while a second user (e.g., an allergic user) may not accept pollen of birch above an allergy-triggering concentration threshold.

An advantage of some embodiments in the context of cleaning and/or scenting is that a cleaning filter and/or a scenting source (e.g., an ampoule) is minimally worn; since they are used during as short a duration as possible while still providing clean and/or well-scented air at occupant entry.

In some embodiments, the method 200 may be seen as an example of the method 100 of FIG. 1. It should be understood that features and examples mentioned in connection to the method 200 may be equally applicable for the method 100 of FIG. 1; and vice versa.

It should also be noted that even through the example method 200 is described as comprising a specific combination of method steps, other embodiments may be envisioned comprising other combinations of method steps described in connection to the example method 200. For example, some embodiments may relate to a method comprising steps 210, 220 and 250 but not steps 230, 240 and 245. Alternatively or additionally, some embodiments may relate to a method comprising only steps 220, 230 and 250 but not steps 210, 240 and 245. Yet alternatively or additionally, some embodiments may relate to a method comprising only steps 220, 230, 240, 245 and 250 but not step 210. Other variations may also be envisioned.

FIG. 3 schematically illustrates an example system according to some embodiments. The system is for preparing a vehicle prior to an occupant entering the vehicle. For example, the system may be configured to cause execution of (e.g., execute) one or more of the method steps described in connection to any of FIGS. 1 and 2.

The system comprises a controller (CNTR; e.g., controlling circuitry, a control module, or a control unit) 300.

The controller is configured to cause acquisition of information indicative of an upcoming time of entry of the occupant into a compartment of the vehicle (compare with steps 120 and 220).

To this end, the controller may comprise or be otherwise associated with (e.g., connectable, or connected, to) an acquirer (ACQ; e.g., acquisition circuitry or an acquisition module) 302. The acquirer may be configured to acquire the information indicative of an upcoming time of entry of the occupant into a compartment of the vehicle.

The information indicative of an upcoming time of entry of the occupant into a compartment of the vehicle may be acquired by reception of a scheduled pick-up time, for example. To this end, the controller may comprise or be otherwise associated with (e.g., connectable, or connected, to) a receiver (REC) 320. The receiver may be configured to receive the scheduled pick-up time.

Alternatively or additionally, the information indicative of an upcoming time of entry of the occupant into a compartment of the vehicle may be acquired by estimation of a time of arrival at a pick-up location, for example. To this end, the controller may comprise or be otherwise associated with (e.g., connectable, or connected, to) a navigation system (NAV) 330. The navigation system may be configured to estimate the time of arrival at the pick-up location.

The controller is also configured to cause commence of air replacement of at least part of the air in the compartment of the vehicle prior to the upcoming time of entry of the occupant (compare with steps 150 and 250).

To this end, the controller may comprise or be otherwise associated with (e.g., connectable, or connected, to) a triggerer (TRIG; e.g., triggering circuitry or a triggering module) 304. The triggerer may be configured to control an air replacer (AR; e.g., an air replacement device) 340 of the vehicle to commence the replacement of at least part of the air in the compartment of the vehicle prior to the upcoming time of entry of the occupant (e.g., by issuing/transmitting a trigger—or other control—signal).

In some embodiments, the air replacer 340 comprises an existing air conditioning system.

The air replacer may be configured to cleaning, temper, and/or scent replacement air as described above. To this end, the air replacer may comprise one or more of: a cleaner (CL) 341, a temperer (TEMP) 342, and a scenter (SC) 343.

The controller may also be configured to cause determination of a latest possible time for commencing the air replacement provided that the air replacement is to be completed at the upcoming time of entry of the occupant (compare with step 230).

To this end, the controller may comprise or be otherwise associated with (e.g., connectable, or connected, to) a time determiner (TD; e.g., time determining circuitry or a time determining module) 303. The time determiner may be configured to determine the latest possible time for commencing the air replacement provided that the air replacement is to be completed at the upcoming time of entry of the occupant. The commencing of air replacement may be controlled based thereon as described above.

The controller may also be configured to cause detection of whether the compartment of the vehicle has occupants and control the air replacement accordingly (compare with step 210).

To this end, the controller may comprise or be otherwise associated with (e.g., connectable, or connected, to) an occupant detector (OD; e.g., occupant detecting circuitry or an occupant detecting module) 301. The occupant detector may be configured to detect whether the compartment of the vehicle has occupants as described above, possibly by reception of signal(s) from one or more sensors (SENS; e.g., image sensor(s), motion sensor(s), life sign sensor(s), seat sensor(s), etc.) 310.

FIG. 4 schematically illustrates an example vehicle 490 according to some embodiments. The vehicle may, for example, comprise one or more of the system components described in connection to FIG. 3. In FIG. 4, this is schematically exemplified by a controller 400 (compare with 300 of FIG. 3), an air replacer 440 (compare with 340 of FIG. 3), one or more sensors 410 (compare with 310 of FIG. 3), a receiver 420 (compare with 320 of FIG. 3), and a navigation system 430 (compare with 330 of FIG. 3).

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments may appear within an electronic apparatus (such as a control unit for a vehicle) comprising arrangements, circuitry, and/or logic according to any of the embodiments described herein. Alternatively or additionally, an electronic apparatus (such as a control unit for a vehicle)

may be configured to perform methods according to any of the embodiments described herein.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a vehicle 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIGS. 1 and 2, or otherwise described herein.

Figure 6:
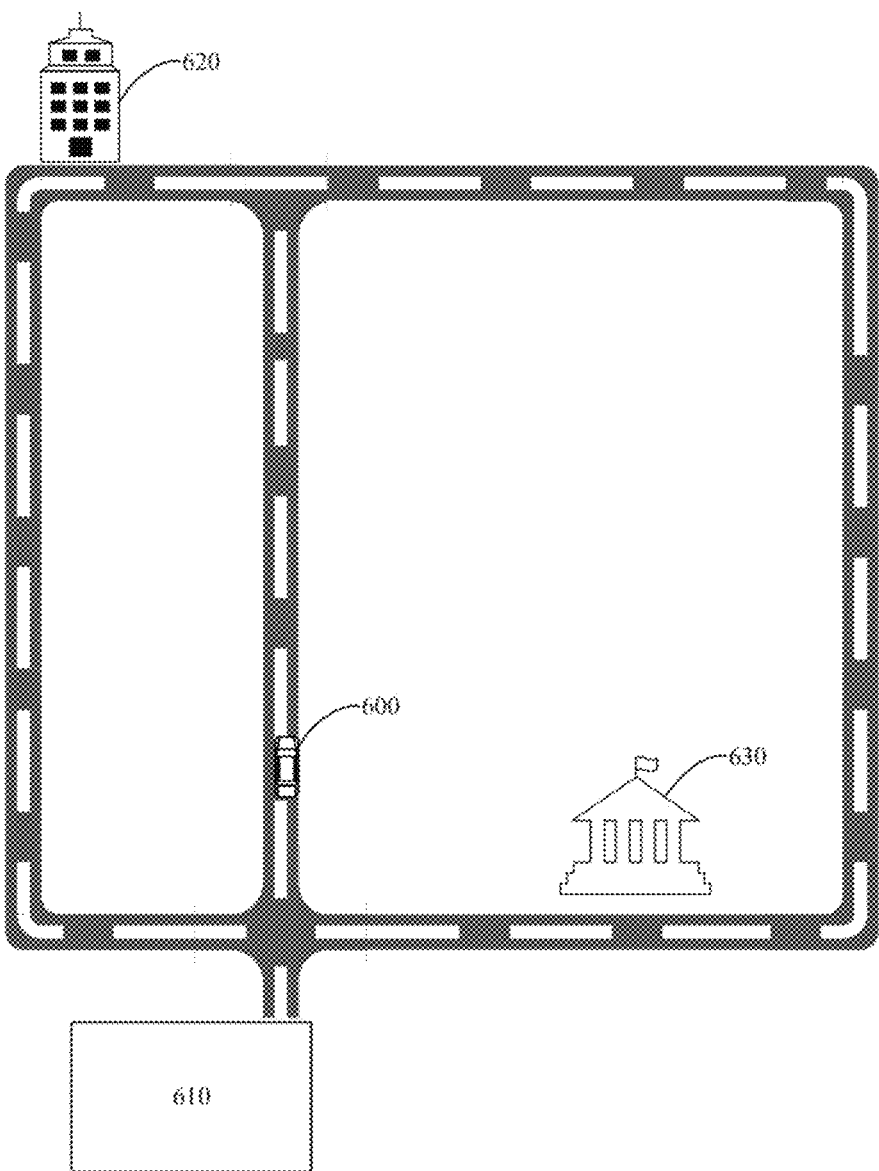
FIG. 6 is a schematic drawing illustrating an example scenario for a vehicle according to some embodiments.

FIG. 6 schematically illustrates some example scenarios for a vehicle (e.g., a personal car, a taxi, or an ambulance) 600 according to some embodiments. FIG. 6 schematically shows a parking space (e.g., a company parking lot, a taxi depot, or an ambulance garage) 610, a first location 620 and a second location 630.

In a first scenario, an ambulance 600 is in the ambulance garage 610 when it receives a pick-up request specifying the first location 620 as pick-up location. Based on the first location 620 and an estimated average speed of the ambulance (considering different possible routes, and possibly knowledge about a typical or actual traffic situation) a navigation system of the ambulance determines an upcoming time of entry of the occupant/patient (i.e., estimates a time of arrival at the first location). Since the ambulance was not in use when the pick-up request was received, the treatment compartment of the ambulance is considered to be empty, and air replacement is commenced at a suitable time relating to a latest possible time as exemplified above.

In a second scenario, an ambulance 600 is in use (e.g., delivering a first patient to a treatment facility at the second location 630) when it receives a pick-up request specifying the first location 620 as pick-up location. Based on the first location 620 and an estimated average speed of the ambulance (considering different possible routes which include first patient drop-off at the second location 630, and possibly knowledge about a typical or actual traffic situation) a navigation system of the ambulance determines an upcoming time of entry of the new occupant/second patient (i.e., estimates a time of arrival at the first location). Since the ambulance is in use when the pick-up request is received, the treatment compartment of the ambulance is considered to be empty when first patient drop-off at the second location 630 is completed, and air replacement is commenced thereafter at a suitable time relating to a latest possible time as exemplified above. In this scenario, air replacement is particularly beneficial if the first patient was contagious; and air replacement combined with cleaning from contagious particles may provide further improvement.

In a third scenario, an autonomous personal car 600 is in the company parking lot 610 when it receives a pick-up request from its owner asking to be picked-up at the entrance of a company building (e.g., work place of the owner); the second location 630. Since the autonomous car was parked (e.g., during the entire work day), it may be considered to be empty, and air replacement is commenced at a suitable time relating to a latest possible time as exemplified above, to be completed before picking up the owner.

In a fourth scenario, a taxi 600 without human driver and still transporting a current customer receives a pick-up request for a future customer specifying the first location 620 as pick-up location. Based on the first location 620 and an estimated average speed (considering different possible routes, speed limits, and possibly knowledge about a typical or actual traffic situation) a navigation system of the taxi determines an upcoming time of entry of the future customer (i.e., estimates a time of arrival at the first location). This determination may be performed when the taxi has delivered the current a customer at the desired destination, or while still transporting the current customer (in the latter case, having delivery at the desired destination of the current customer as an additional requirement). When the taxi has delivered the current a customer at the desired destination (e.g., the second location 630), it is considered to be empty, and air replacement is commenced at a suitable time relating to a latest possible time as exemplified above.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for preparing a vehicle prior to an occupant entering the vehicle, wherein the vehicle comprises an air replacement device, the air replacement device being operable in a plurality of different modes having different levels of vigor, the method comprising:

acquiring information indicative of an upcoming time of entry of the occupant into a compartment of the vehicle;

determining a point in time prior to the upcoming time of entry of the occupant that allows for replacement of at least a predetermined portion of the air in the vehicle compartment to be completed just before the upcoming time of entry of the occupant when the air replacement device in the vehicle is operated in a high vigor mode;

detecting whether the vehicle compartment has any occupants at the determined point in time; and initiating operation of the air replacement device in the vehicle compartment at the determined point in time and operating the air replacement device in the vehicle in the high vigor mode so that the replacement of the at least predetermined portion of the air in the vehicle compartment is completed prior to the upcoming time of entry of the occupant, wherein the operation of the air replacement device is only initiated provided no occupants are detected in the vehicle compartment at the determined point in time.

2. The method of claim 1, wherein detecting that the compartment of the vehicle has no occupants comprises one or more of:

using an image sensor and image recognition algorithms to determine absence of occupants;

using a motion detector to determine absence of motions;

using an ultrasonic sensor to determine absence of motions;

using a temperature sensor to determine absence of warm-blooded bodies;

using a life sign sensor to determine absence of life signs;

using a seat sensor to determine that a weight applied to a seat does not exceed a weight threshold value;

receiving a pick-up request; and detecting—responsive to destination arrival—customer payment and/or compartment door closing and/or loss of signal for a wireless communication device.

3. The method of claim 1, wherein acquiring information indicative of an upcoming time of entry of an occupant into the vehicle comprises one or more of:

estimating the time of entry based on a statistical use pattern for the vehicle;

estimating the time of entry based on a distance between the vehicle and a wireless communication device associated with the occupant;

receiving a scheduled pick-up time; and estimating a time of arrival at a pick-up location.

4. The method of claim 1, further comprising:

determining a latest possible time for commencing the air replacement provided that the air replacement is to be completed at the upcoming time of entry of the occupant; and commencing the air replacement based on the determined latest possible time.

5. The method of claim 4, wherein determining the latest possible time for commencing the air replacement provided that the air replacement is to be completed at the upcoming time of entry of the occupant is based on a shortest possible time for air replacement.

6. The method of claim 4, wherein commencing the air replacement based on the determined latest possible time comprises one or more of:

commencing air replacement in association with occurrence of the latest possible time; and commencing air replacement immediately if the latest possible time has already occurred.

7. The method of claim 1, further comprising cleaning air before injection into the interior of the vehicle.

8. The method of claim 1, further comprising heating and/or chilling air in association with injection into the interior of the vehicle.

9. The method of claim 1, further comprising scenting air in association with injection into the interior of the vehicle.

10. The method of claim 8, further comprising:

acquiring information indicative of preferences of the occupant entering the vehicle; and controlling heating/chilling and/or cleaning and/or scenting of air based on the preferences.

11. The method according to claim 1, wherein the vehicle is operating to provide transport service to occupants.

12. The method according to claim 11, further comprising:

determining that a transport service of a previous occupant of the vehicle compartment to a destination is completed; and commencing the air replacement after the vehicle has arrived at the destination.

13. A non-transitory computer readable medium storing a computer program comprising program instructions, the computer program being loadable into a data processing unit and configured to cause execution of the method according to claim 1 when the computer program is run by the data processing unit.

14. A control unit for controlling preparation of a vehicle prior to an occupant entering the vehicle, the control unit being configured to cause execution of the method according to claim 1.

15. An apparatus for controlling preparation of a vehicle prior to an occupant entering the vehicle, wherein the vehicle comprises an air replacement device, the air replacement device being operable in a plurality of different modes having different levels of vigor, the apparatus comprising controlling circuitry configured to cause:

acquisition of information indicative of an upcoming time of entry of the occupant into a compartment of the vehicle;

determination of a point in time prior to the upcoming time of entry of the occupant that allows for replacement of at least a predetermined portion of the air in the vehicle compartment to be completed just before the upcoming time of entry of the occupant when the air replacement device in the vehicle is operated in a high vigor mode;

detection of whether the vehicle compartment has any occupants at the determined point in time; and initiation of operation of the air replacement device in the vehicle compartment at the determined point in time and operating the air replacement device in the vehicle in the high vigor mode so that the replacement of the at least predetermined portion of the air in the vehicle compartment is completed prior to the upcoming time of entry of the occupant, wherein the operation of the air replacement device is only initiated provided no occupants are detected in the vehicle compartment at the determined point in time.

16. A system for preparing a vehicle prior to an occupant entering the vehicle, wherein the vehicle comprises an air replacement device, the air replacement device being that is operable in a plurality of different modes having different levels of vigor, the system comprising:

a receiver configured to acquire information indicative of an upcoming time of entry of the occupant into a compartment of the vehicle; and controlling circuitry configured to:

determine a point in time prior to the upcoming time of entry of the occupant that allows for replacement of at least a predetermined portion of the air in the vehicle compartment to be completed just before the upcoming time of entry of the occupant when the air replacement device in the vehicle is operated in a high vigor mode;

detect whether the vehicle compartment has any occupants at the determined point in time; and control the air replacement device of the vehicle to initiate operation of the air replacement device in the vehicle compartment at the determined point in time and operating the air replacement device in the vehicle in the high vigor mode so that the replacement of the at least predetermined portion of the air in the vehicle compartment is completed prior to the upcoming time of entry of the occupant, wherein the operation of the air replacement device is only initiated provided no occupants are detected in the vehicle compartment at the determined point in time.

17. A vehicle comprising the system of claim 16.

* * * * *